United States Patent [19]

Kotthaus

[11] 4,224,834

[45] Sep. 30, 1980

[54] MATING SPUR GEARS

[75] Inventor: Erich Kotthaus, Walliseilen, Switzerland

[73] Assignee: Oerlikon-Bührle AG, Zürich, Switzerland

[21] Appl. No.: 957,985

[22] Filed: Nov. 6, 1978

Related U.S. Application Data

[62] Division of Ser. No. 729,351, Oct. 4, 1976, Pat. No. 4,183,703.

[30] Foreign Application Priority Data

Oct. 24, 1975 [CH] Switzerland .................. 13770/75

[51] Int. Cl.³ ............................................. F16H 55/08
[52] U.S. Cl. ....................................... 74/462; 74/414
[58] Field of Search ................ 74/412, 462, 413, 414

[56] References Cited

U.S. PATENT DOCUMENTS

| 3,184,988 | 5/1965 | Osplack et al. | 74/462 X |
| 3,220,279 | 11/1965 | Dareing | 74/462 |

FOREIGN PATENT DOCUMENTS 898340  6/1962  United Kingdom ............... 74/462

*Primary Examiner*—C. J. Husar
*Assistant Examiner*—Conrad Berman
*Attorney, Agent, or Firm*—Werner W. Kleeman

[57] ABSTRACT

A pair of mating spur gears, wherein the teeth of the one spur gear element possess an involute-shaped tooth depth profile and the teeth of the mating spur gear element possess a straight tooth depth profile.

3 Claims, 15 Drawing Figures

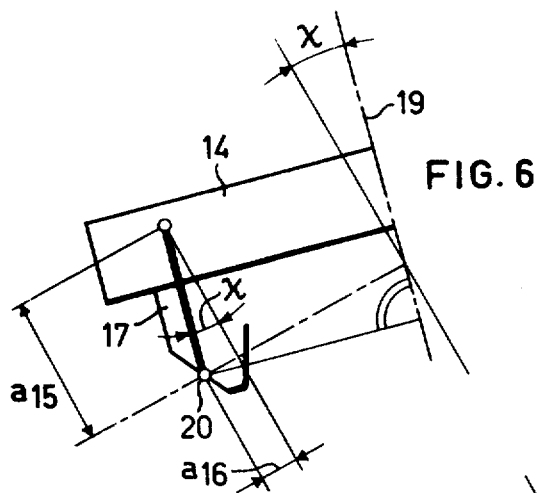
FIG. 6
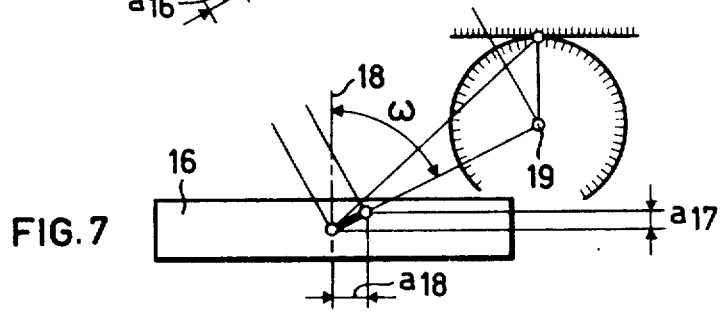
FIG. 7
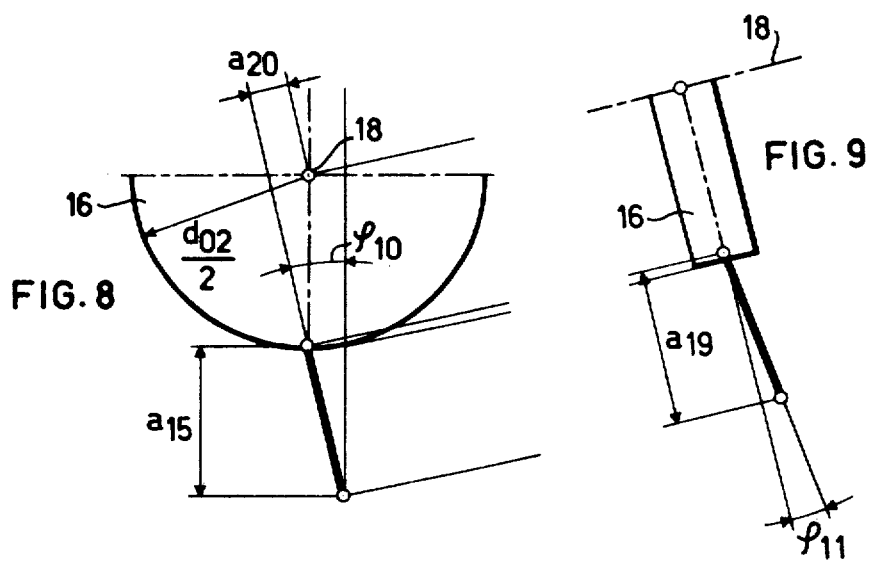
FIG. 8
FIG. 9

4,224,834

MATING SPUR GEARS

CROSS-REFERENCE TO RELATED CASE

The present application is a divisional of my copending, commonly assigned United States application, Ser. No. 729,351, now U.S. Pat. No. 4,183,703 filed Oct. 4, 1976. Applicant also is the owner of commonly assigned U.S. application Ser. No. 796,401, filed May 12, 1977.

BACKGROUND OF THE INVENTION

The present invention relates to a new and improved method for manufacturing a pair of spur gears by cutting the tooth gaps with a rotating end cutter head.

The invention further relates to a novel gear cutting machine for the performance of the method, and to a pair of spur gears produced according to such method.

There are already known different methods for manufacturing pairs of spur gears, which have the drawback that both spur gears of a pair of gears must be produced by carrying out a generating process.

SUMMARY OF THE INVENTION

It is a primary object of the present invention to provide a new and improved method of producing pairs of spur gears which is not associated with such drawback and renders possible the use of more efficient machines, by means of which, on the one hand, there can be improved the quality of the fabricated gears and, on the other hand, there can be shortened the manufacturing time.

Now in order to implement these and still further objects of the invention, which will become more readily apparent as the description proceeds, the inventive method for producing a pair of spur gears is manifested by the features that for the fabrication of the one spur gear one of the elements—the spur gear or the end cutter head—carries out a circular rolling or generating movement about an axis which coincides or approximately coincides with the gear axis of the mating gear, and the mating gear is produced by a cutting-in depth or plunge cut operation without any generating or rolling movement.

There is already known a method for manufacturing arcuate-shaped teeth for bevel gears, wherein the flanks of the teeth of the one bevel gear are produced by means of an end cutter head which is moved in an arc corresponding to the curvature of the tooth. With this technique the one bevel gear is produced without any generating movement, whereas the other bevel gear is produced by a generating movement, and there is not generated or rolled along an imaginary crown gear rather along an imaginary bevel gear corresponding to the mating gear.

This heretofore known method for the production of bevel gears however cannot be used as such for the manufacture of spur gears, since it cannot be carried out upon the heretofore known gear cutting machines, since with such machines the cutter head is located upon a rolling cradle, the axis of which cutter head however cannot be positioned perpendicular to the axis of the rolling cradle, as would be necessary for this purpose.

The inventive gear cutting machine for carrying out the method of the invention is manifested by the features that one of the elements—the spur gear or the end cutter head—is rotatably mounted in a rolling cradle, the axis of the end cutter head is arranged perpendicular and the axis of the spur gear is arranged parallel to the axis of the rolling cradle, and one of both elements is displaceable in the axial direction and the other of such two elements is arranged to be pivotable relative to the other.

The pair of spur gears produced according to this method is manifested by the features that the teeth of the one spur gear are curved in cycloidal-shape in the lengthwise direction of the tooth and have an involute-shaped tooth depth profile, and the teeth of the mating gear are likewise curved in cycloidal-shape in the tooth lengthwise direction, but have a linear tooth depth profile.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIGS. 6, 7, 8 and 9 illustrate in different views the respective position of the spur gear and cutter head for crown cutting;

DETAILED DESCRIPTION OF THE PREFERRED EMBODIMENTS

Figure 1:
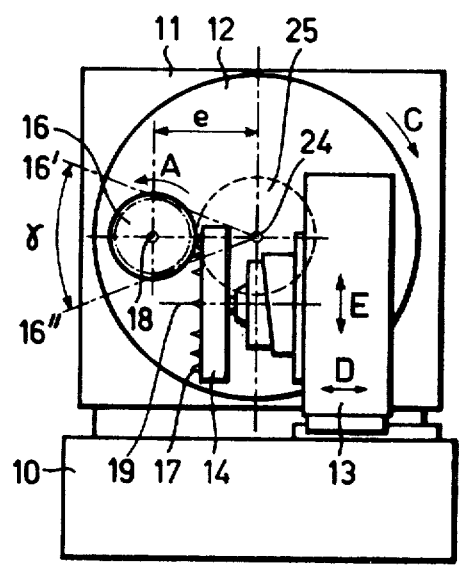
FIG. 1 illustrates a first exemplary embodiment of a gear cutting machine viewed from the front.

Describing now the drawings, according to FIG. 1 the gear cutting machine, at which there is carried out the method of the invention for producing spur gear transmissions, by way of example, will be seen to comprise a machine bed 10. At this machine bed 10 there is arranged, on the one hand, a rolling cradle stock 11 having a rolling or generating cradle 12 and, on the other hand, a headstock 13 at which there is rotatably mounted a cutter head 14.

Figure 2:
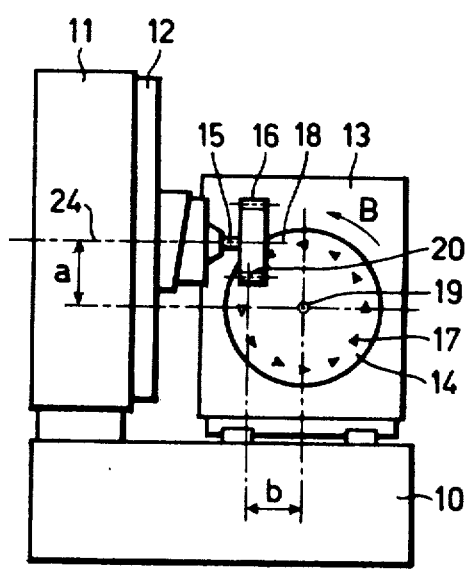
FIG. 2 is a side view of the gear cutting machine of FIG. 1.
Figure 3:
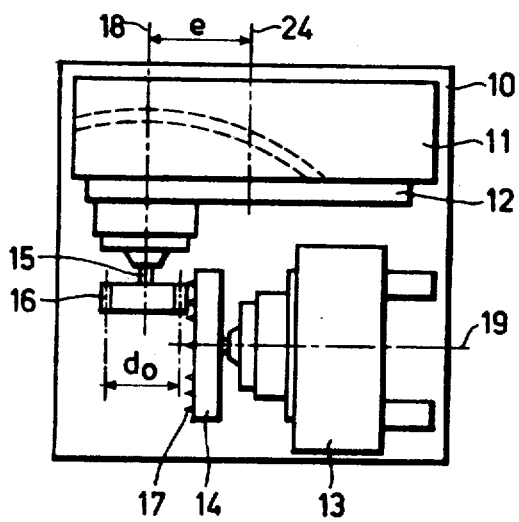
FIG. 3 is a top plan view of the gear cutting machine of FIG. 1.

According to the showing of FIGS. 2 and 3, the rolling cradle 12 possesses a spindle 15 at which there is attached the spur gear 16 to be machined. At the cutter head 14 there are secured a number of cutters 17.

During the production of a spur gear 16, which rotates in the direction of the arrow A, the cutter head 14 rotates in the direction of the arrow B and the rolling cradle 12, in the event a generating or rolling movement is needed, can rotate in the direction of the arrow C. For the cutting-in depth or plunge cut operation it is possible to displace the headstock 13 in the direction of the arrow D.

The rotational speed of the spur gear 16 and the cutter head 14 are coordinated in conventional manner to one another such that in each instance a cutter 17 or a group of cutters penetrate into a tooth gap of the spur gear 16 and the next cutter 17 or the next group of cutters penetrates into the next tooth gap of the spur gear 16 to be produced.

The spur gear 16 can be fabricated either by a pure generating or rolling movement without a cutting-in depth movement or by a pure cutting-in depth movement without any generating movement. In order that there is produced a spur gear transmission it is necessary, with the here described gear cutting machine, that a spur gear be produced by a cutting-in depth operation and a mating gear by a generating or rolling movement.

The spacing a between the spur gear axis 18 and the cutter head axis 19 as well as the spacing b between the computation point 20 at the spur gear 16 and the cutter head axis 19 can be easily calculated, as will be more fully explained hereinafter in conjunction with FIG. 4.

Figure 4:
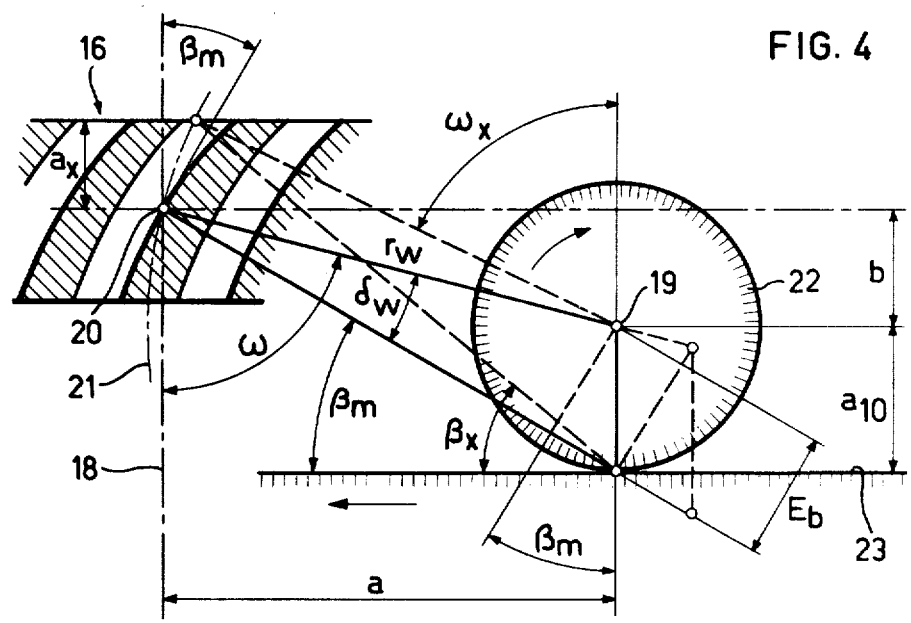
FIG. 4 is a schematic illustration of the geometric conditions prevailing between the spur gear and the cutting head.

According to the showing of FIG. 4, the cutter head 14, which has not been here illustrated, rotates about the cutter head axis 19, and in so doing a cutter 17 describes the circular arc 21. This cutter 17, in the showing of FIG. 4, is located at the previously mentioned computation point 20.

For the sake of simplicity it is assumed that penetrating through each tooth gap is a single cutter 17. The rotational speed $n_w$ of the cutter head 14 and the rotational speed $n_r$ of the spur gear 16 are then dependent upon the number of teeth z of the spur gear 16 and the number of cutters $z_w$. There will be seen from FIG. 4 the following relationship:

$$\sin \delta_w = (E_b/r_w) = (z_w m_n/2r_w)$$

The mentioned distance a and b now are determined from the radius $r_w$ of the cutter head and its angle of inclination $\omega$ relative to the spur gear axis 18, namely:

$a = r_w \sin \omega$
$b = r_w \cos \omega$
wherein
$\omega = 90° - \beta_m + \delta_w$ The angle of skew $\beta$ changes as a function of the spacing $a_x$ from the tooth center. Since it can be significant to know the manner in which the spiral angle varies from the center of the tooth towards the outside, below there are given the most important equations for calculating the angle of skew.

$$\cos \omega_x = \frac{a_x + b}{r_w}$$

$$\cos \omega_x = \frac{a_x + r_w \cos \omega}{r_w} = \cos \omega + \frac{a_x}{r_w}$$

$$tg \beta_w = \frac{r_w \cdot \cos \omega_x + a_{10}}{r_w \cdot \sin \omega_x} = \frac{r_w \cos \omega_x + \frac{z_w m_n}{2 \cos \beta_m}}{r_w \sin \omega_x}$$

$$= ctg \omega_x + \frac{\sin \delta_w}{\cos \beta_m \cdot \sin \omega_x}$$

Figure 5:
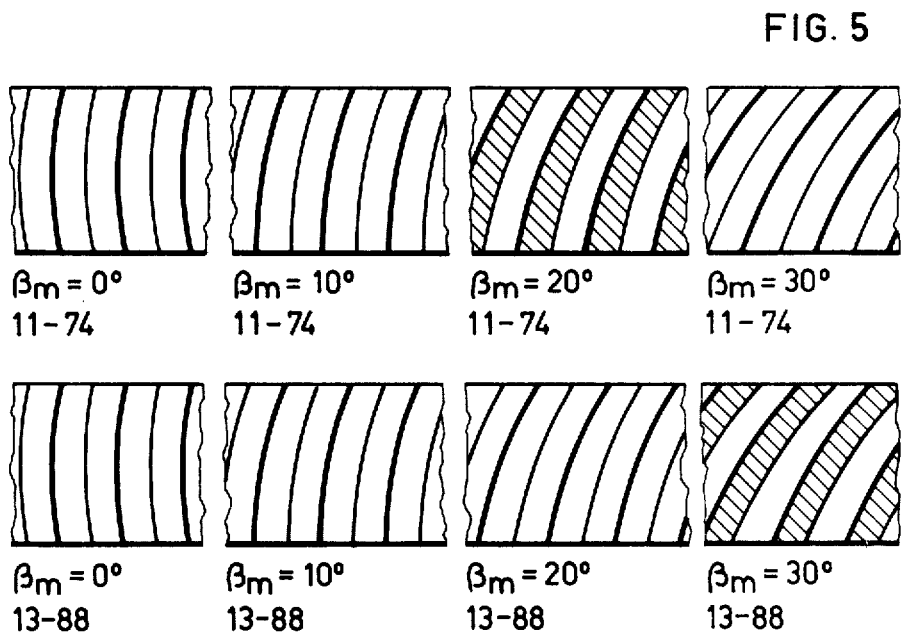
FIG. 5 illustrates essentially, to scale, the tooth profiles of the spur gears.

In FIG. 5 there are illustrated to scale a number of longitudinal tooth lines of spur gears. Apart from the angle of $$n_w/n_r = z/z_w$$

Further, if it is assumed that the spur gear 16 stands still, and that the cutter head 14 carries out a generating or rolling movement upon a plane 23 with a rolling wheel 22 of the radius $a_{10} = E_b/\cos \beta_m$, then it is clear that there are formed cycloidal-shaped curved longitudinal tooth lines.

The pitch circle diameter $d_o$ of the spur gear 16 (FIG. 3) is determined from the teeth number z, the normal plane pitch $m_n$ and the cosine of the angle of skew $\beta_m$. Thus there exists the relationship:

$$d_o = z \cdot m_n / \cos \beta_m$$

The generating circle radius $a_{10} = E_b/\cos \beta_m$ is dependent upon the cutter number $z_w$ and the normal plane pitch $m_n$. There exists the relationship:

$$E_b = (z_w m_n/2)$$

Finally, there can be derived from the radius $r_w$ of the cutter head 14 and the generating circle radius $E_b$ the angle $\delta_w$ as follows:

$$\sin \delta_w = (E_b/r_w) = (z_w m_n/2r_w)$$

The mentioned distances a and b now are determined from the radius $r_w$ of the cutter head and its angle of inclination $\omega$ relative to the spur gear axis 18, namely:
$a = r_w \sin \omega$
$b = r_w \cos \omega$
wherein
$\omega = 90° - \beta_m + \delta_w$ The angle of skew $\beta$ changes as a function of the spacing $a_x$ from the tooth center. Since it can be significant to know the manner in which the spiral angle varies from the center of the tooth towards the outside, below there are given the most important equations for calculating the angle of skew.

$$\cos \omega_x = \frac{a_x + b}{r_w}$$

$$\cos \omega_x = \frac{a_x + r_w \cos \omega}{r_w} = \cos \omega + \frac{a_x}{r_w}$$

$$tg \beta_w = \frac{r_w \cdot \cos \omega_x + a_{10}}{r_w \cdot \sin \omega_x} = \frac{r_w \cos \omega_x + \frac{z_w m_n}{2 \cos \beta_m}}{r_w \sin \omega_x}$$

$$= ctg \omega_x + \frac{\sin \delta_w}{\cos \beta_m \cdot \sin \omega_x}$$

In FIG. 5, there are illustrated to scale a number of longitudinal tooth lines of spur gears. Apart from the angle of skew $\beta_m$ there is indicated the number of cutters $z_w$ and the cutter radius $r_w$. Thus, the relationship: "$\beta_m = 0°$; 5–39" means that $\beta_m = 0°$, $z_w = 5$ and $r_w = 39$ mm.

As already mentioned, with the herein described machine, it is necessary that a spur gear is produced by a cutting-in depth operation and that the mating gear is produced by a generating operation, but if both spur gears are to be produced with a generating technique, the rolling cradle must be replaced by an apparatus which allows for a linear generating or rolling movement. For an exact roll-off or generating movement the spacing e between the spur gear axis 18 and the rolling cradle axis 24 must be equal to the sum of the pitch circle radii of both spur gears in meshing engagement with one another. If therefore the pitch circle radius of both spur gears is designated by d1/2 and d2/2, then:

$$e = (d1 + d2/2)$$

This rolling or generating movement has been illustrated in FIG. 1. Whereas the cutter head 14 and the spur gear 16 continuously rotate about their own axes 19 and 18, respectively, the rolling cradle 12 rotates about the rolling cradle axis 24. The spur gear 16 thus moves out of the position 16' into the position 16", and the spur gear axis 18 describes an arc of the angle $\gamma$. During this movement, the spur gear 16 is rolled-off or generated relative to the cutters 17 of the cutter head 14. It can be thus imagined that the cutter 17 constitutes a tooth of the mating gear 25, the axis of which coincides with the rolling cradle axis 24. Since the cutter 17 possesses straight flanks, afterwards the mating gear 25 also must have straight flanks.

With this machine the size of the spur gears 16 which can be produced thereat, are determined by the spacing $e = (d1 + d2/2)$ between the spur gear axis 18 and the rolling cradle axis 24 as well as by the spacing $a = r_w \sin\omega$, wherein $r_w$ = cutter head radius and $\omega = 90° - \beta_m + \delta_w$, and wherein e is essentially dependent upon the size of the rolling cradle 12.

The described method for fabricating spur gears also makes it possible to produce a longitudinal crown at the teeth. This crown can be infinitely varied by changing the size of the inclination of the cutter head. The longitudinal crown is preferably produced at the gear having the straight tooth depth profile. In order to obtain a longitudinal crown-spur gear transmission or gearing, it is necessary, on the one hand, to adjust the angle between the spur gear axis 18 and the cutter head axis 19 and, on the other hand, to adjust the spacing a between the spur gear axis 18 and the cutter head axis 19 in accordance with the desired crown.

As will be realized from the following calculations, the aforementioned spacing a must be reduced by an amount $a_{20}$. The cutter head axis 19 furthermore must be rocked through an angle $\rho_{11}$ out of the plane which is disposed perpendicular to the spur gear axis 18 and the rolling cradle axis 24.

As will be apparent from FIGS. 6 to 9, for the longitudinal crown the cutter head axis 19 must be rocked in a plane perpendicular to the tangent at the point of contact 20 (FIG. 4) through the angle $\chi$ (FIG. 6). It is necessary to pivot the cutter head axis 19 through the angle $\rho_{10}$ (FIG. 8) with respect to the horizontal plane in which there are located the spur gear axis 18 and the rolling cradle axis 24. However, instead of pivoting through both of these pivot angles $\chi$ and $\rho_{10}$, it is possible to rock the cutter head axis 19 in the mentioned horizontal plane about the mentioned angle $\rho_{11}$ and to displace such by the mentioned value $a_{20}$ towards the spur gear axis 19.

According to FIG. 6 there is present the relationship:

$$tg\chi = a_{16}/a_{15}$$

According to FIG. 7 there is present the relationship:

$$\sin\omega = a_{18}/a_{16}$$

According to FIG. 8 there is present the relationship:

$$tg\rho_{10} = \frac{a_{18}}{a_{15}}, \cos\rho_{10} = \frac{a_{15}}{a_{19}} \text{ and } \cos\omega = \frac{a_{17}}{a_{16}}$$

According to FIG. 9 there is present the relationship:

$$\sin\rho_{11} = (a_{17}/a_{19})$$

By substitution there is derived:

$$tg\rho_{10} = tg\chi \cdot \sin\omega$$
$$\sin\rho_{11} = tg\chi \cdot \cos\omega \cdot \cos\rho_{10}$$
$$a_{20} = 0.5 d_{02} \cdot \sin\rho_{10}$$

Figure 10:
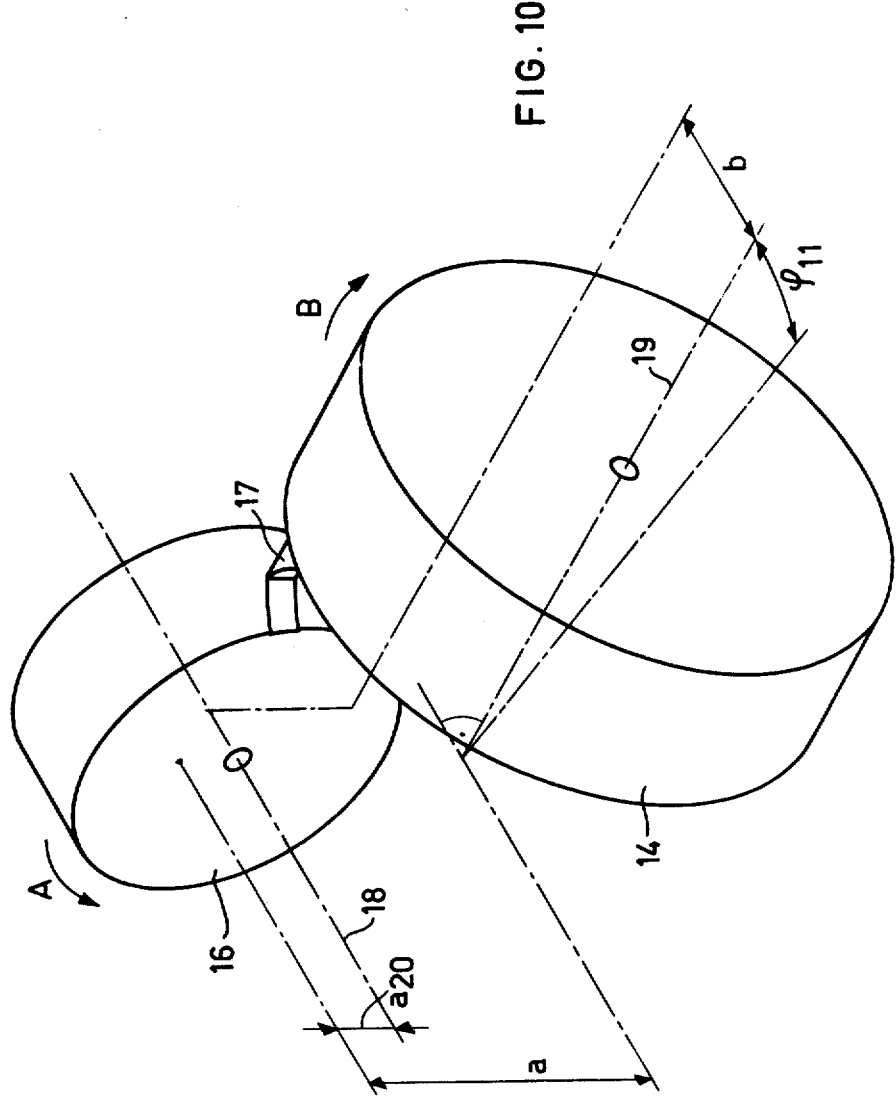
FIG. 10 is a perspective view of the spur gear and cutter head.

For purposes of clarification, there have been illustrated in perspective view in FIG. 10, the cutter head 14 and the spur gear 16 and there have been plotted the necessary corrections $\rho_{11}$ and $a_{20}$. The angle $\rho_{11}$ can be adjusted either by rocking the cutter head axis 19 or by rocking the spur gear axis 18. Equally, there can be displaced either the cutter head axis 19 or the spur gear axis 18 to the desired spacing $a - a_{20}$. The different displacement possibilities will be apparent from the showing of FIGS. 1 to 3. The cradle 12 together with the support or cradle stock 11 is pivotably mounted upon the machine bed 10. The cutter head axis 19 is vertically displaceable in the housing 13.

Figure 11:
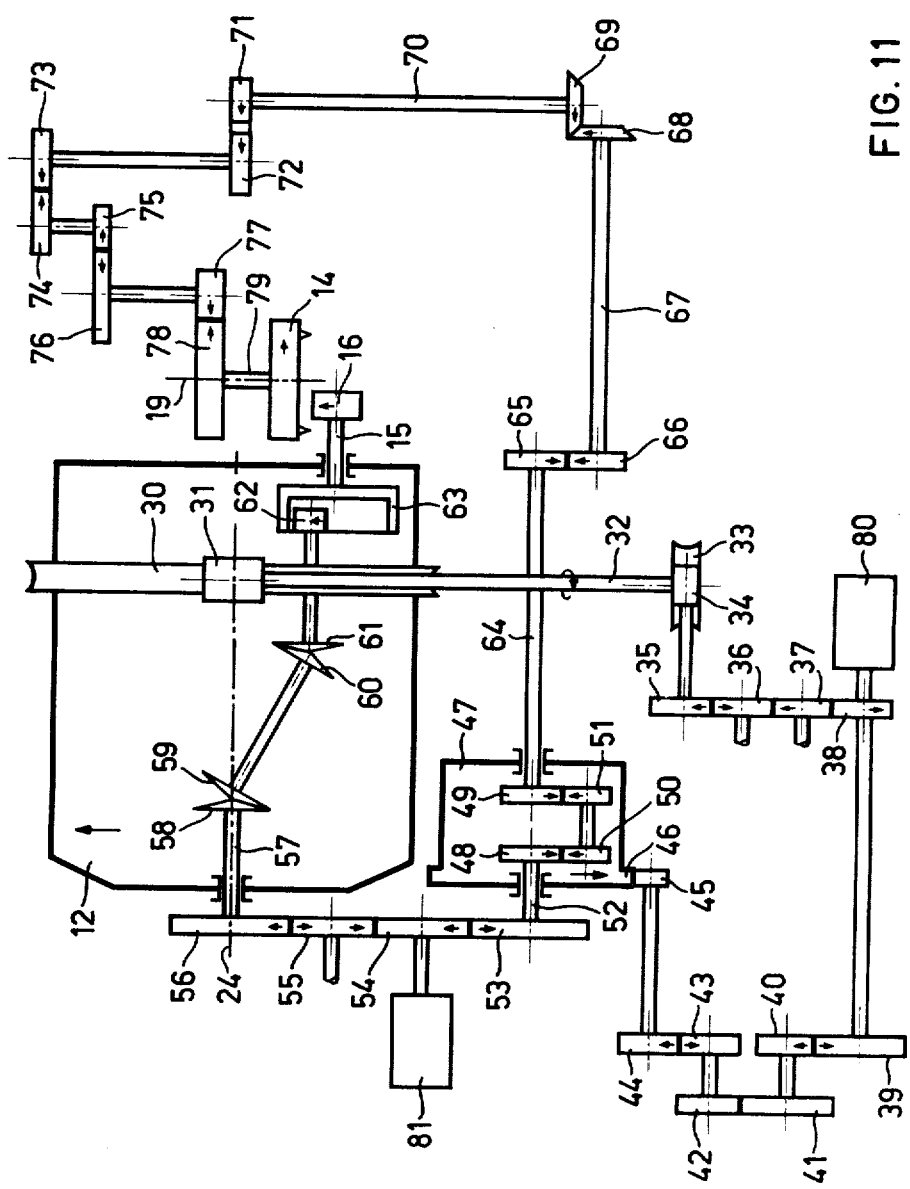
FIG. 11 is a schematic illustration of a transmission employed with the inventive apparatus.

The drive of the rolling cradle 12, spur gear 16 and cutter head 14 will be apparent from the showing of FIG. 11.

According to FIG. 11, there is attached to the rolling cradle 12 a worm gear 30 which meshes with a worm 31. The worm 31 is secured to a shaft 32 which is provided at its other end with a worm gear 33. The worm gear 33 meshes with a further worm 34. This worm 34 is connected through the agency of four spur gears 35, 36, 37, and 38 via six change-speed gears 39, 40, 41, 42, 43 and 44 in driving relationship with a spur gear 45. This spur gear 45 meshes with a toothed rim 46 which is attached to a housing 47 of a differential transmission or gearing. In this housing 47 there are located two sun gears 48 and 49 as well as two planetary gears 50 and 51. The sun gear 48 is connected by a shaft 52 with a spur gear 53. The spur gear 53 is drivingly connected by means of the spur gears 54, 55 and 56 with a shaft 57 mounted at the rolling cradle axis 24. The shaft 57 is drivingly connected via the pairs of bevel 58, 59 and 60, 61 with a spur gear 62. The spur gear 62 meshes with a disk 63 internally provided with teeth, and which disk is secured to the spindle shaft 15 at which there is seated the spur gear 16 to be machined. The other sun gear 49 is drivingly connected by means of the shaft 64, the change-speed gears 65, 66, the shaft 67, the bevel gears 68 and 69, and the shaft 70 with an index gearing. This index gearing possesses six spur gears 71, 72; 73, 74; 75, 76 and is drivingly connected with a spur gear 77. The spur gear 77 meshes with a spur gear 78 arranged at the cutter head axis 19. The spur gear 78 is rigidly connected by means of a shaft 79 with the cutter head 14. Provided for the drive of the rolling cradle 12 is a first electric motor 80 which drives the spur gear 38, and for the drive of the spur gear 16 which is to be produced and the cutter head 14 there is provided a second electric motor 81 which drives the spur gear 54.

Instead of, as described, using the rolling cradle 12 for the rolling or generating movement during the production of the one spur gear 16 and to produce the other spur gear 25 by a cutting-in depth or plunge cut operation, both spur gears can be produced by a rolling or generating operation. For this purpose, the rotating cutter head 14 is shifted in the direction of the arrow E. The rolling cradle 12 then must not rotate, the cradle drive is therefore disconnected.

Figure 12:
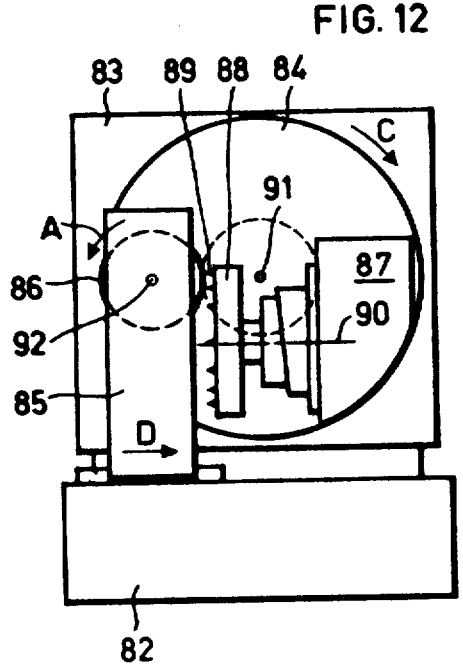
FIG. 12 illustrates a second exemplary embodiment of a gear cutting machine as viewed from the front.
Figure 13:
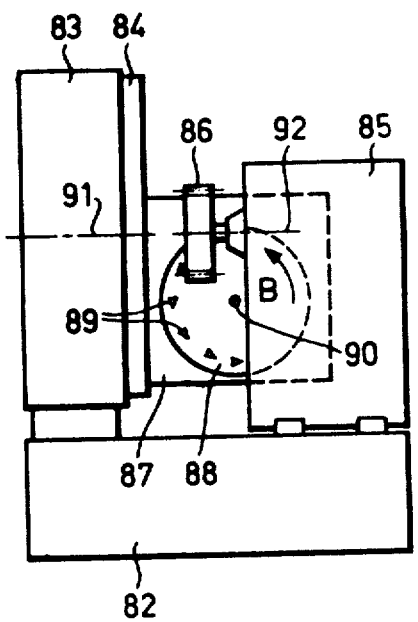
FIG. 13 illustrates the modified gear cutting machine of FIG. 12 as viewed from the side.
Figure 14:
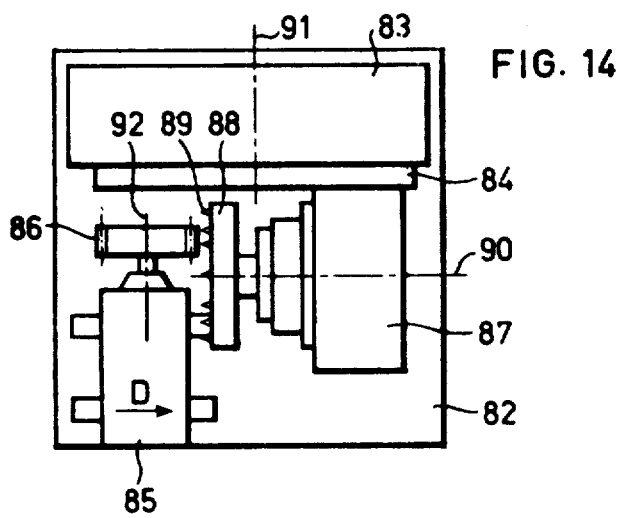
FIG. 14 illustrates a top plan view of the modified gear cutting machine of FIG. 12.

According to FIG. 12, the second embodiment of gear cutting machine for carrying out the inventive method comprises a machine bed 82. Arranged upon this machine bed 82 is, on the one hand, a cradle stock or support 83 with a rolling cradle 84, and, on the other hand, a headstock 85 upon which there is rotatably mounted the spur gear 86 to be fabricated. According to FIGS. 13 and 14, the rolling cradle 84 possesses a spindle housing 87 which carries a cutter head 88. At the cutter head 88 there are attached a number of cutters or knives 89. Just as was the case for the gear cutting machine, according to the first exemplary embodiment (FIGS. 1 to 3), with the gear cutting machine according to the second exemplary embodiment (FIGS. 12 to 14), the cutter head axis 90 is arranged perpendicular to the rolling cradle axis 91 and the spur gear axis 92 is parallel to the rolling cradle axis 91.

During the production of a spur gear 86 it rotates exclusively in the direction of the arrow A about its stationary spur gear axis 92. The cutter head 88 rotates in the direction of the arrow B and the rolling cradle 84, to the extent that a rolling or generating movement is necessary, rotates in the direction of the arrow C.

For the cutting-in depth or plunge cut movement it is only necessary to displace the headstock 85 with the spur gear 86 in the direction of the arrow D.

The rotational speeds of the spur gear 86 and the cutter head 88, also with this exemplary embodiment of gear cutting machine, are coordinated to one another in conventional manner in such a way that in each instance a cutter 89 or a group of cutters penetrates into a tooth gap of the spur gear 86 and the next cutter 89 or the next group of cutters penetrates into the next tooth gap of the spur gear 86 to be produced.

In order to improve the bearing area configuration during the rolling or generating movement, the spacing e between the spur gear axis 18 and the rolling cradle axis 24 can be increased or reduced. Due to this change in the spacing e there is formed over the angle of skew $\beta_m$ a tooth bending or torsion, so that in the case of crown(camber)-bearing teeth there are realized bearing area corrections ensuring for greater shifting capability and increased quiet running.

Figure 15:
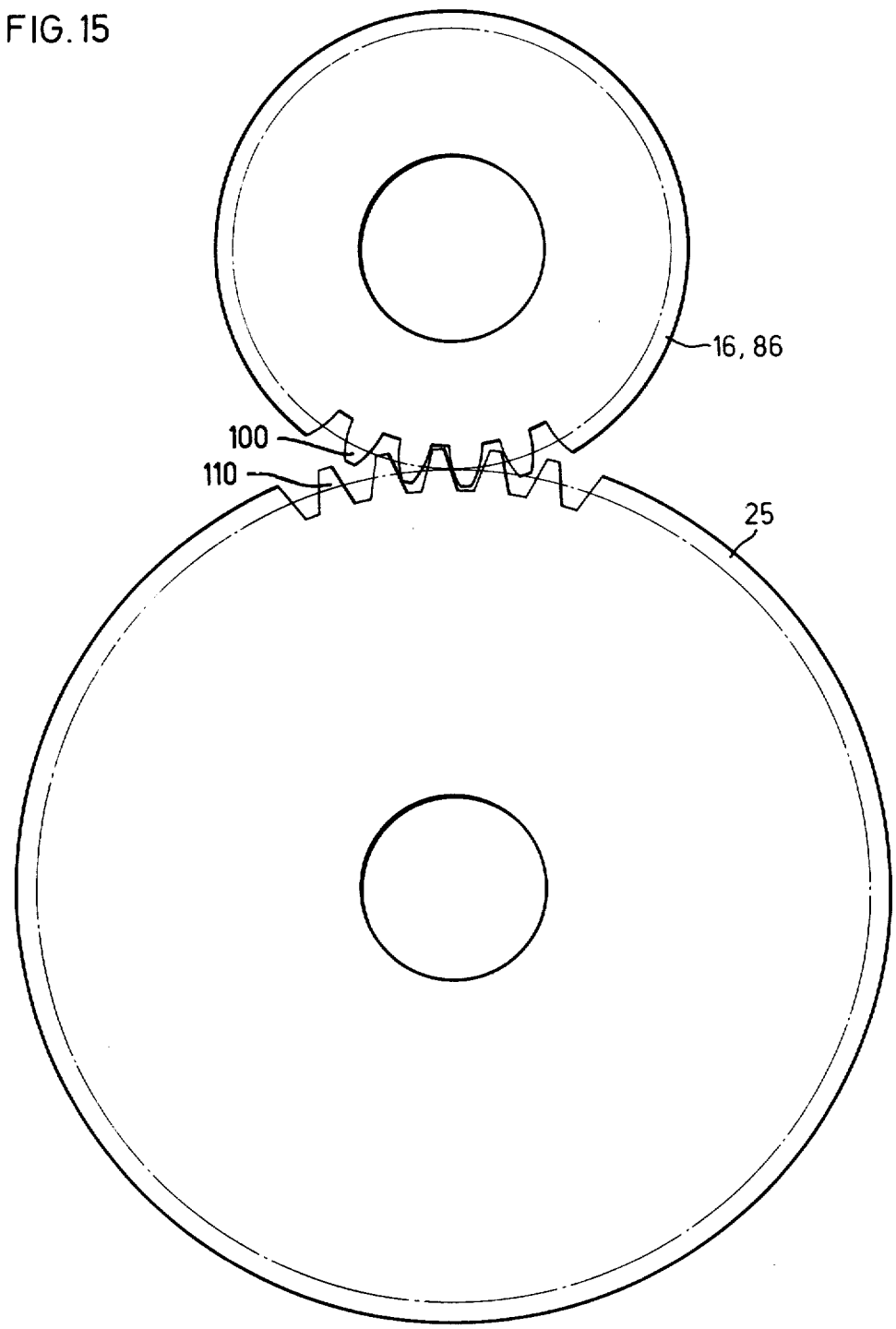
FIG. 15 illustrates a pair of mating spur gears produced by the invention.

Finally, in FIG. 15 there are shown a pair of spur gears 16 (FIG. 1) or 86 (FIG. 12) and 25 produced according to the teachings of the invention. The teeth 100 of the spur gear 16 are curved in cycloidal-shape in the lengthwise direction of the related tooth and have involute-shaped tooth depth profile, and the teeth 110 of the mating gear 25 are likewise curved in cycloidal-shape in the tooth lengthwise direction, but have a linear tooth depth profile.

While there are shown and described present preferred embodiments of the invention, it is to be distinctly understood that the invention is not limited thereto, but may be otherwise variously embodied and practiced within the scope of the following claims.
ACCORDINGLY,

What I claim is:

1. A pair of mating spur gear elements having substantially parallel gear axes and produced by cutting out the tooth gaps with an end cutter head element, wherein there is imparted to one of the elements—the spur gear element or the end cutter head element—an arcuate-shaped generating movement about an axis in order to produce one of the spur gear elements, said axis at least approximately coinciding with the spur gear axis of the mating gear element, the mating gear element is produced by a plunge cut operation without any generating movement, wherein the teeth of the one spur gear element possess an involute-shaped tooth depth profile and the teeth of the mating gear element possess a straight tooth depth profile, and the teeth of both spur gear elements are curved in substantially cycloidal-shape in the lengthwise direction of the teeth.

2. A pair of mating spur gears having substantially parallel gear axes wherein the teeth of the one spur gear element possess an involute-shaped tooth depth profile and the teeth of the mating gear element possess a straight tooth depth profile.

3. A pair of mating spur gears having substantially parallel gear axes wherein the teeth of the one spur gear are curved in substantially cycloidal-shape in the lengthwise direction of their teeth and have an involute-shaped tooth depth profile, and the teeth of the mating gear are curved in cycloidal-shape in the lengthwise direction of the teeth but have a straight tooth depth profile.

* * * * *